United States Patent [19]

Hunter, III et al.

[11] Patent Number: 4,582,609
[45] Date of Patent: Apr. 15, 1986

[54] FILTRATION DEVICE AND METHOD

[75] Inventors: John S. Hunter, III, White Bear Lake; Alan B. Staples, Minneapolis, both of Minn.

[73] Assignee: Minnesota Mining and Manufacturing Company, St. Paul, Minn.

[21] Appl. No.: 714,266

[22] Filed: Mar. 21, 1985

Related U.S. Application Data

[63] Continuation of Ser. No. 582,386, Feb. 22, 1984, abandoned.

[51] Int. Cl.[4] .............................................. B01D 23/10
[52] U.S. Cl. .................................... 210/747; 210/807; 210/170
[58] Field of Search ............... 210/661, 779, 793, 170, 210/242.1, 275, 271, 500, 506, 747, 807

[56] References Cited

U.S. PATENT DOCUMENTS

| | | | |
|---|---|---|---|
| 621,899 | 3/1899 | Charvat | 210/242.1 |
| 3,303,932 | 2/1967 | Hirs et al. | 210/242.1 |
| 3,402,817 | 9/1968 | Dovel | 210/242.1 |
| 3,471,025 | 10/1969 | Dobson | 210/290 |
| 4,111,713 | 9/1978 | Beck | 106/288 B |
| 4,422,929 | 12/1983 | Owens | 210/242.1 |

FOREIGN PATENT DOCUMENTS

| | | | |
|---|---|---|---|
| 816481 | 7/1969 | Canada | 182/35 |
| 128459 | 7/1968 | Czechoslovakia . | |
| 141652 | 9/1971 | Czechoslovakia . | |
| 189242 | 9/1981 | Czechoslovakia . | |
| 2835251 | 2/1980 | Fed. Rep. of Germany . | |
| 833327 | 3/1956 | United Kingdom . | |

OTHER PUBLICATIONS

"Buoyant Media Filter" by K. W. Simmers at 40th Annual Meeting of the International Water Conference, Pittsburgh, Pa., Oct., 1979.

"Upflow Filtration Through a Buoyant Filter Bed" by J. Rozkydalek & I. Tesarik at 14th International Water Supply Assoc. Congress & Exhibition, Zurich, Switzerland, Sep. 1982.

Primary Examiner—John Adee
Attorney, Agent, or Firm—Donald M. Sell; James A. Smith; Roger R. Tamte

[57] ABSTRACT

A new filtration device which floats in a body of the liquid to be filtered and which makes use of a bed of granular buoyant filtration media. The device comprises buoyancy means for giving the device sufficient buoyancy to float in the body of liquid; flow-defining structure attached to the buoyancy means and defining a flow path through which liquid may flow upwardly from the body of liquid; porous retaining means disposed across the defined flow path for holding a bed of buoyant filtration media against the force of liquid flowing upwardly through the path; and outlet means in communication with said flow path for conveying filtered liquid away from the filtration device. In use, the device is placed in the body of liquid; the buoyancy of the buoyant structure maintained such that the device floats in the body of liquid with the porous retaining means at a level lower than the surface level of the body of liquid; and a bed of buoyant granular filter media disposed within the defined flow path under the porous retaining means. Liquid is filtered through the bed of buoyant media and collected. The buoyancy of the device can be adjusted to move it through a backwashing cycle.

3 Claims, 4 Drawing Figures

FILTRATION DEVICE AND METHOD

This is a continuation of U.S. patent application Ser. No. 582,386 filed Feb. 22, 1984, now abandoned.

BACKGROUND OF THE INVENTION

Interest has developed in using beds of buoyant granules as a substitute for sand filtration beds, particularly for use in filtering water for potable use and for wastewater treatment. With buoyant filtration media, liquid is typically pumped upwardly through a bed of the media, which is held in place by a porous retaining means such as a screen, and the filtered water is collected at the top of the bed, as in an overflow weir disposed around the porous screen. See Smith, British Pat. No. 833,327; Miks, Canadian Pat. No. 816,481 (as well as Czechoslovakian Pat. Nos. 141,652; 128,459 and equivalents thereof); a paper by K. W. Simmers at the 40th Annual Meeting of the International Water Conference, Pittsburgh, Pa., U.S.A., October, 1979; and a paper by J. Rozkydalek and I. Tesarik, 14th International Water Supply Association Congress and Exhibition, Zurich, Switzerland, September 1982.

Conventionally with sand filter beds, as well as with the suggested buoyant filter beds, the bed of filtration media is located in a stationary, stabilized apparatus through which liquid to be clarified is passed. Such apparatus requires a significant construction effort, with a support structure such as a foundation, and a superstructure for holding the filter beds and providing means for liquid to be conveyed into and out of the filter. Operating costs are also significant, since energy is required to pump liquid through the bed for clarification, as well as for reversing liquid flow to clean the filter bed.

SUMMARY OF THE INVENTION

The present invention makes use of buoyant filtration media to provide a new filtration device of fundamentally different, economical construction and inexpensive operation. This new device includes buoyancy means so that the device floats in a body of the liquid being filtered or clarified. Flow-defining structure is attached to the buoyancy means and defines a path through which liquid may be passed upwardly from the body of liquid, with porous retaining means being disposed across the path for holding a bed of buoyant filtration media against the force of liquid passing upwardly through the path and against the buoyant force of the media itself. The flow-defining structure includes an overflow weir over which liquid passed through the bed of filtration media flows, and an outlet means is connected to the overflow weir for conveying filtered liquid away from the filtration device.

For a filtering operation, buoyancy is selected so that the device floats in the body of liquid, preferably at a level such that the porous retaining means is held at a level lower than the surface level of the body of liquid. A bed of buoyant filtration media is disposed under the porous retaining means, and the pressure differential caused because the surface of the body of liquid is at a higher level than the overflow weir forces liquid through the bed and into the outlet means, without the need for pumping as required in other filter designs.

DETAILED DESCRIPTION OF THE INVENTION

Figure 1:
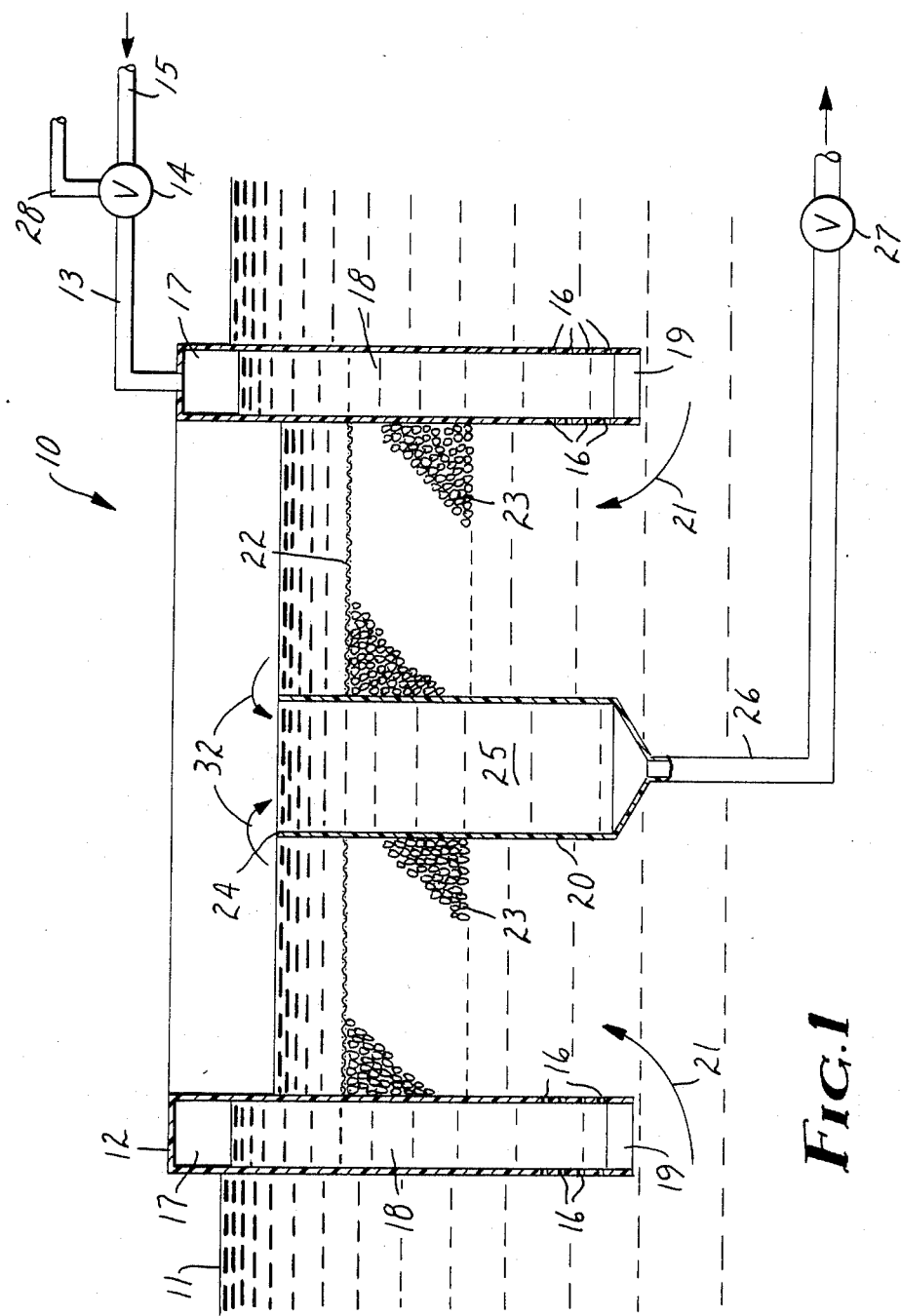
FIGS. 1, 2, and 3 are schematic diagrams showing a representative filtration device of the invention at different stages of operation.

FIG. 1 shows a representative filtration device of the invention 10 disposed in a body of liquid 11. The filtration device 10 comprises buoyancy means, in this case an annular collar 12 connected through conduit 13 and valve 14 to a source 15 of pressurized gas such as air. Gas can be introduced through the valve 14 to change the buoyancy provided by the collar. In this embodiment the collar is hollow and perforated at the bottom with many openings 16 through which liquid from the body of liquid 11 can enter the collar against the pressure of gas 17 in the collar. The ratio of air or other gas 17 within the collar to liquid 18 within the collar is adjusted with the valve 14 so that the complete filtration device assumes a desired level within the body of liquid 11. The collar is typically made from a plastic such as polyethylene, and may include a metal weight such as the metal ring 19 at the bottom of the collar. However, the collar can also be made from metal, rubber, or any other gas-retaining material. If desired, the collar is an inflatable bladder, which is inflated or deflated to raise or lower the device in the body of liquid.

A central tubular member 20 is disposed concentrically within the buoyancy collar 12, and together the collar 12 and tubular member 20 define a flow path 21 for liquid to flow upwardly from the body of liquid 11. A porous retaining means, in this embodiment a screen 22, is attached between the collar 12 and tubular member 20. A bed 23 of granular buoyant filtration media is disposed under or below the retaining screen (i.e., upstream in the flow path 21 of liquid being filtered). The top edge 24 of the tubular member 20 serves as a weir over which filtered liquid flows as indicated by arrows 32. The liquid flowing over the weir is collected in a collection well 25 inside the tubular member 20. An outlet conduit 26 such as a hose or pipe is connected to the collection well, and a valve 27 is disposed in the conduit to control flow of liquid through the outlet conduit.

The driving force for operation of the filtration device 10 is the pressure differential that exists because the overflow weir 24 is lower than the surface level of the body of liquid 11. This difference in pressure or "head" causes liquid from the body of liquid 11 to flow up through path 21, through the bed 23 of granular filtration media, over the overflow weir 24, into the collection well 25, and down through the conduit 26.

Figure 2:
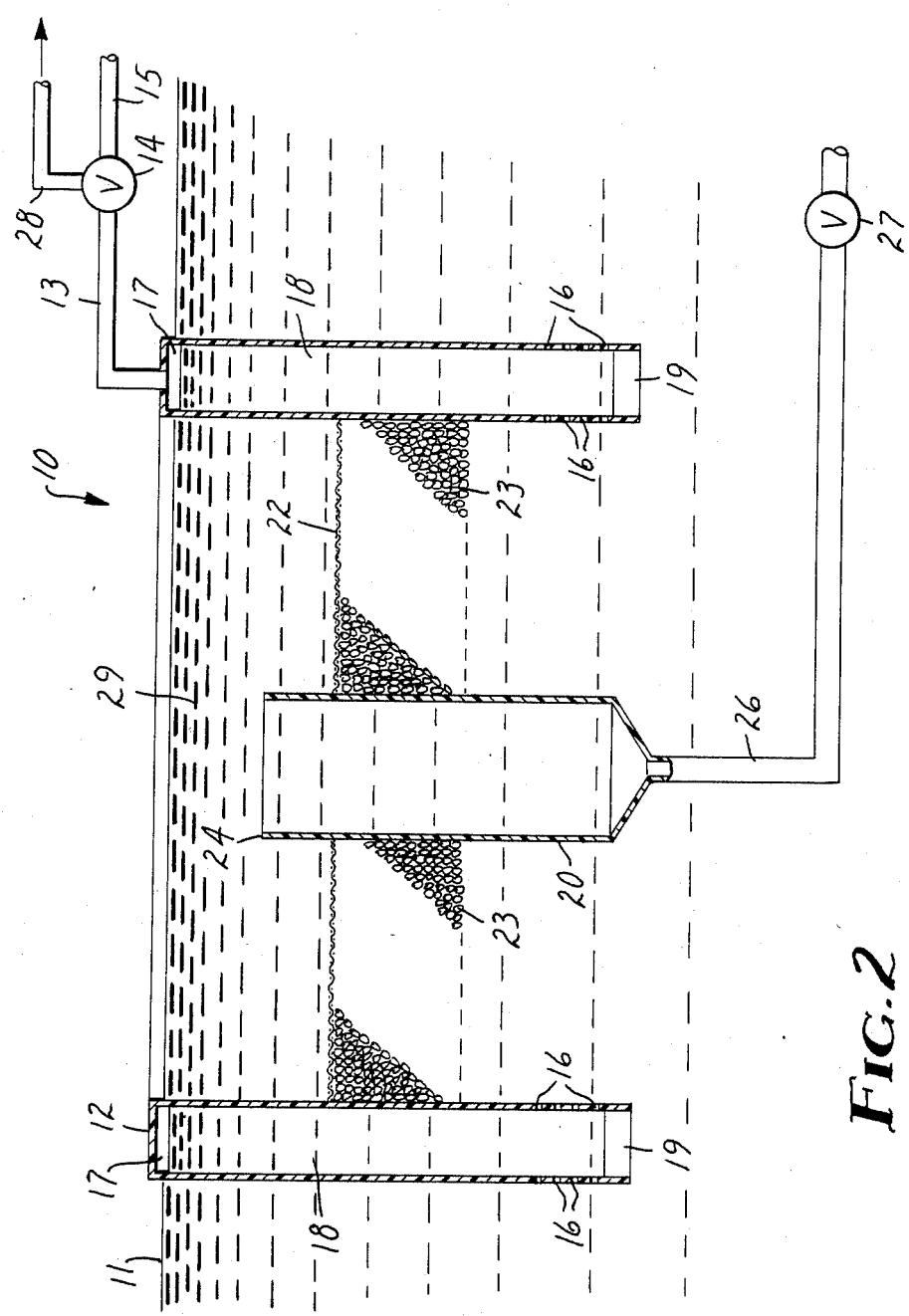
Figure 3:
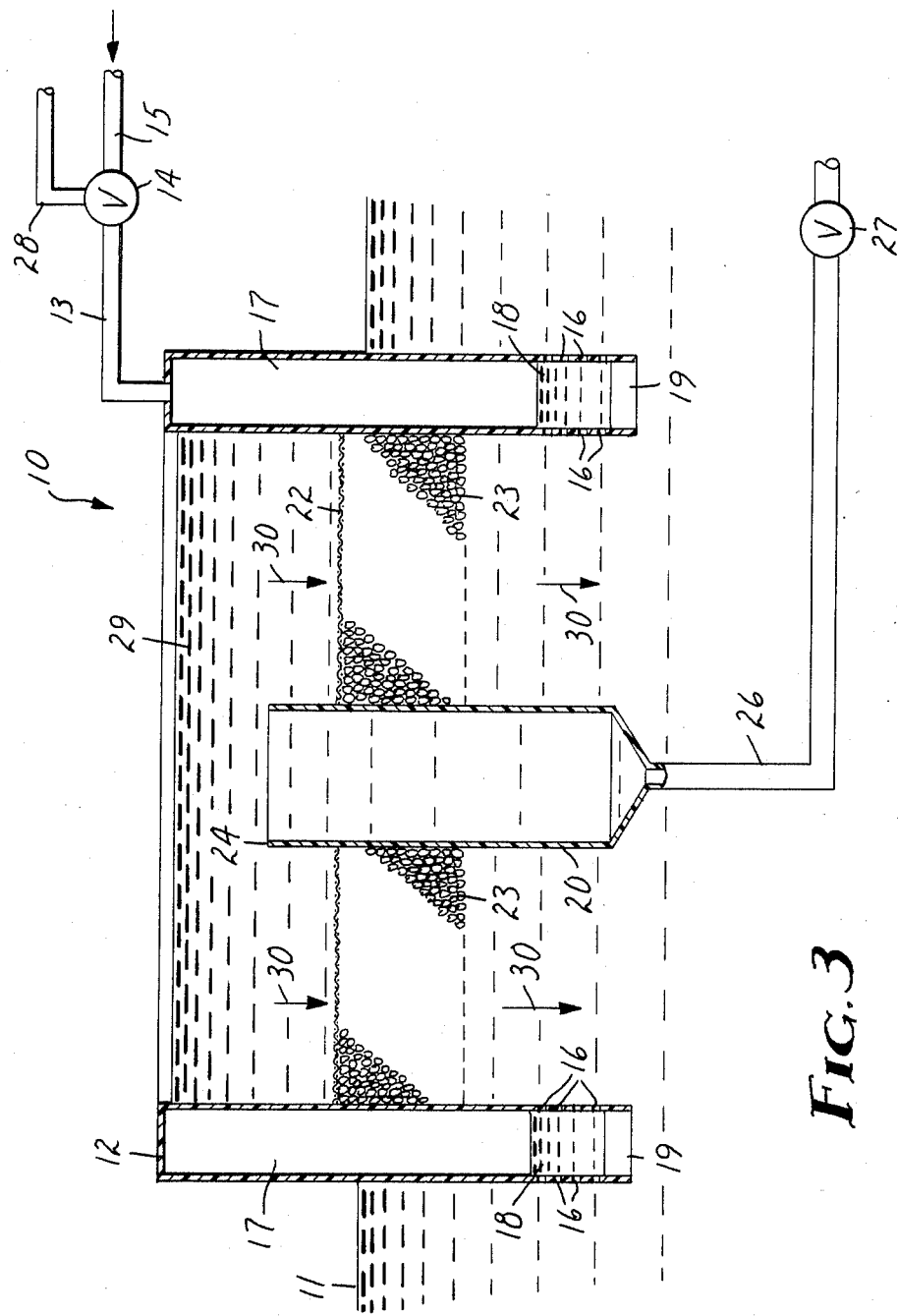

Solids suspended in the body of liquid 11 are collected by the bed 23 of buoyant filtration media. In some cases, depending upon the nature of the suspended solids and their interaction with the filtration media, at least some of the collected solids will tend to settle down and away from the bed of granular filtration media. However, in most cases collected solids will be removed by a back-washing operation. In a typical back-washing operation the valve 27 is closed and gas from the buoyancy collar is released, i.e., by turning valve 14 to discharge the gas through the conduit 28 to a vacuum line or to atmosphere. The filtration device is thus caused to partially sink as shown in FIG. 2, whereupon substantial amounts of liquid 29 for the back-washing operation are collected above the filtration bed 23. Gas is then again introduced into the buoyancy collar 12 providing the collar with increased buoyancy, and raising the device 10 in the body of liquid 11 until it reaches a level as illustrated in FIG. 3. The pressure differential formed because the level of liquid 29 within the collar is higher than outside the collar causes liquid to flow backward through the bed 23 of filtration media in the direction of the arrows 30 whereby the bed expands and turbulence is induced within the bed. The collected solids are dislodged from the bed and settle to the bottom of the body of liquid.

The device is then ready for gas to be released from the buoyancy collar until the device has settled to a level such as illustrated in FIG. 1, which is its normal operating level. Valve 27 is opened to allow filtered liquid to again flow to its discharge point.

A device of the invention is particularly advantageous when applied to removing suspended solids from effluents of oxidation ponds used for wastewater treatment. However, the device and method can also be used for other liquids such as hydrocarbons, halogenated hydrocarbons or other organic solvents or mixtures of solvents. In another embodiment finely divided solids or flocculant particulate material are removed or collected from process solutions.

A variety of granular materials of appropriate light weight (i.e., having a specific gravity less than that of the liquid being filtered) are useful as buoyant filtration media in the invention. Hollow spheres such as taught in U.S. Pat. No. 4,111,713, and which are marketed as 3M Brand Macrospheres by Minnesota Mining and Manufacturing Company, Saint Paul, Minn., are preferred. Other useful buoyant filtration media include other kinds of hollow plastic spheres, e.g., made from polymers such as epoxy resins; foamed or unfoamed polymeric materials such as foamed polystyrene; hollow glass microspheres; and naturally-occurring particles such as wood or cork particles. The media should not cause undesired contamination of the effluent or filtered liquid.

The illustrated cylindrical buoyant collar, which is circular in cross-section is preferred. However square, rectangular, elliptical or other cross-sectional shapes are also useful. Also, buoyancy can be provided by other structures such as a central buoyant structure surrounded by a spaced wall attached to the buoyant structure by spokes, and with a screen supported between the buoyant structure and wall.

Figure 4:
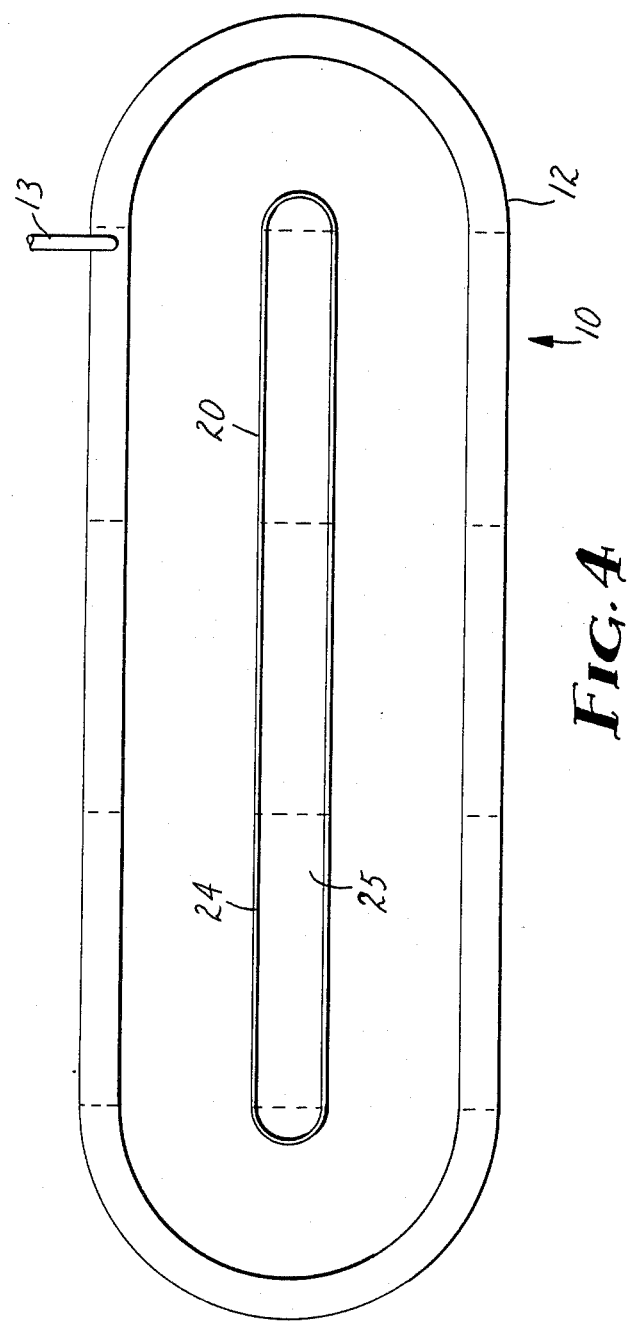
FIG. 4 is a schematic plan view of a different embodiment of the invention.

A filter device of the invention can also be in modular form. For example, a device as shown in FIG. 1 can be divided in half vertically, and additional rectangular sections fastened between the two halves as shown in FIG. 4 to enlarge the capacity of the device.

It is preferred that the outlet of the conduit 26 be at an elevation far enough below the level of the bottom of the collection well so that filtered liquid will flow by gravity. However, if it is desired to release or collect filtered liquid at a point higher than that level, a pump can be used to assist movement of the liquid.

Automated controllers can be used to maintain the buoyancy of the device during normal operation and to actuate and regulate the backwashing cycle, if it is desired to avoid manual control of the device. Such controllers can be pneumatically or electrically powered.

In certain applications, the backwash procedure described herein may be supplemented by a more vigorous cleaning action, such as use of spray nozzles, mechanical stirring devices and the like, mounted in the filtration device.

If desired other apparatus may be combined with a filtration device of the invention. For example, a slant tube or slant plate clarifier package as described in Czechoslovkian Pat. No. 189,242 may be included in the dirty liquid inlet below the filter media. Also flow control structures may be positioned below the filter bed to provide control of solids backwashed from the filter bed as shown in Czechslovakian Pat. No. 141,652.

A filtration device of the invention can be installed in any or all of the clarifiers used in biological and physical/chemical wastewater treatment plants for improving clarifier performance. A device of the invention can also be installed in or immediately downstream of primary clarifiers in wastewater treatment plants to treat wastewater being bypassed around the secondary treatment processes during periods of excessive hydraulic loadings on the treatment plant and/or for the purpose of reducing the organic loading on the downstream treatment process.

As a further illustration, a floating filtration device as illustrated in FIGS. 1–3 was constructed using a 4-foot-diameter, 5-foot-high cylindrical buoyancy collar made from polyethylene counterweighted with a 300-pound ring-shaped steel plate. The tubular member 20 was also made of polyethylene and a stainless steel screen was connected between the collar and tubular member. Compressed air was used to provide buoyancy in the buoyancy collar. The device was installed by floating it in a wastewater polishing pond, and the outlet hose was connected to an outlet pipe of the pond. The device was found to be stable and functional when operated through the stages illustrated in FIGS. 1–3.

What is claimed is:

1. A method for removing suspended solids from a body of liquid comprising:
    (a) placing in the body of liquid from which the suspended solids are to be removed a filtration device that comprises buoyancy means for giving said device sufficient buoyancy to float in said body of liquid; flow-defining structure attached to said buoyancy means and defining a flow path through which liquid may flow upwardly from said body of liquid; porous retaining means disposed across said defined flow path, thereby holding a bed of buoyant filtration media against the force of said liquid flowing upwardly through said flow path; an overflow weir disposed downstream on said flow path from said porous retaining means, over which said liquid passed upwardly through said buoyant filtration media flows; and outlet means in communication with said overflow weir for conveying filtered liquid away from the filtration device;
    (b) maintaining the buoyancy of the buoyant structure such that said device floats in said body of liquid with said porous retaining means at a level lower than the surface level of said body of liquid;
    (c) disposing a bed of buoyant granular filter media within said defined flow path under said porous retaining means; and
    (d) collecting the liquid filtered through said bed of buoyant media.

2. A method as defined in claim 1 in which said bed of buoyant granular filtration media comprises hollow spheres.

3. A method as defined in claim 1 in which the top of said overflow weir is maintained at a level lower than said surface level of said body of liquid during the filtration process.

* * * * *